April 29, 1924.
C. FOUST
1,491,853
COLLAPSIBLE BUCKET AND RECEPTACLE FOR THE SAME
Filed Dec. 18, 1922     2 Sheets-Sheet 1
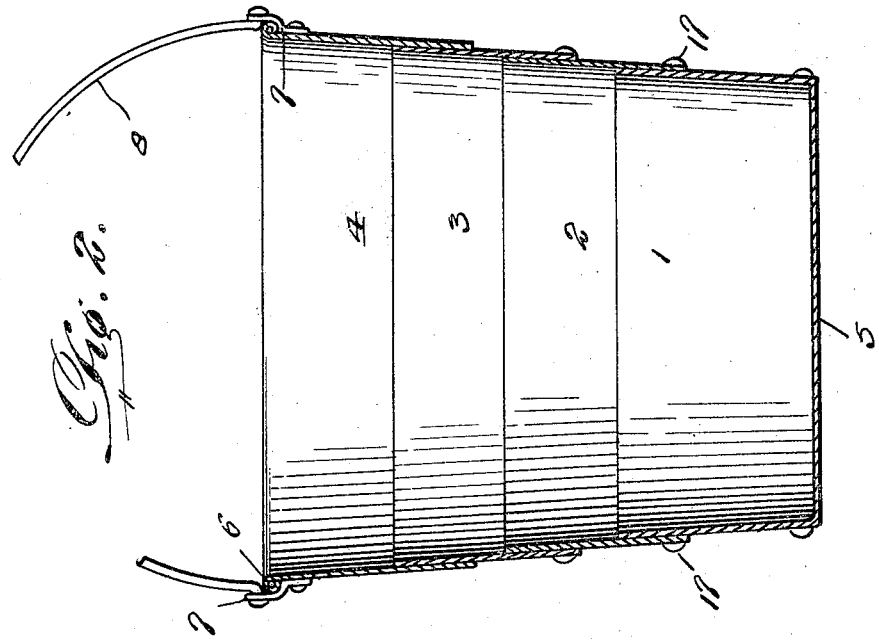
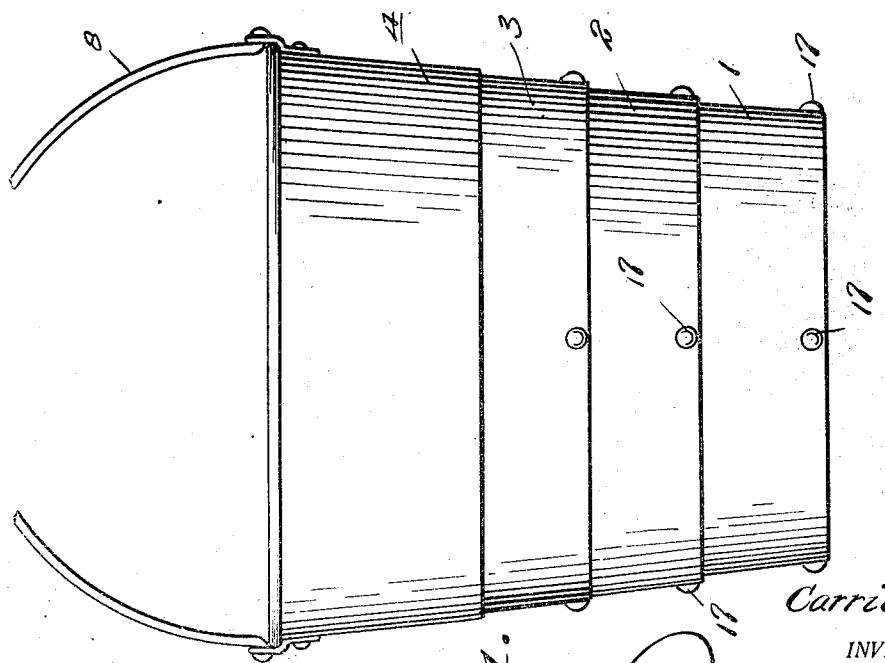
Carrie Foust,
INVENTOR.
ATTORNEY.

April 29, 1924.
C. FOUST
1,491,853
COLLAPSIBLE BUCKET AND RECEPTACLE FOR THE SAME
Filed Dec. 18, 1922    2 Sheets-Sheet 2
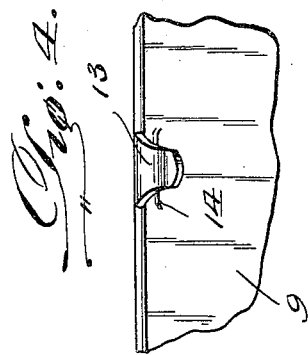
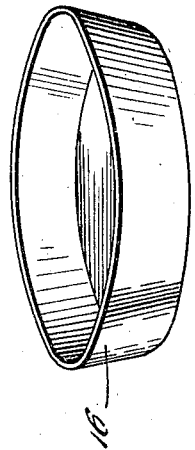
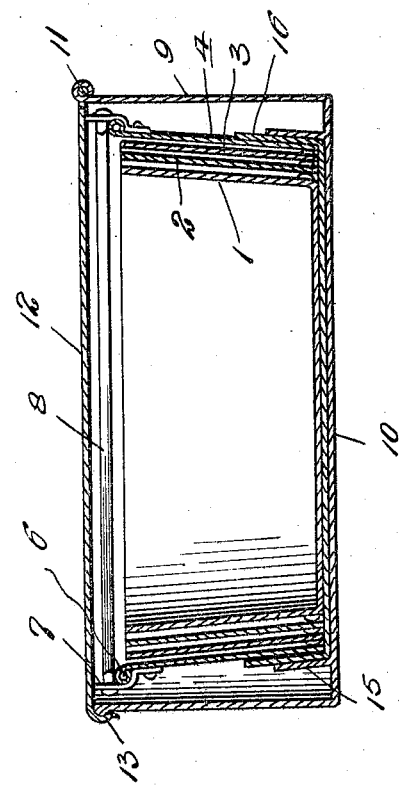
Carrie Foust,
INVENTOR.
Witnesses:
BY
ATTORNEY.

Patented Apr. 29, 1924.

1,491,853

UNITED STATES PATENT OFFICE.

CARRIE FOUST, OF SONESTOWN, PENNSYLVANIA.

COLLAPSIBLE BUCKET AND RECEPTACLE FOR THE SAME.

Application filed December 18, 1922. Serial No. 607,746.

*To all whom it may concern:*

Be it known that I, CARRIE FOUST, a citizen of the United States, residing at Sonestown, in the county of Sullivan and State of Pennsylvania, have invented certain new and useful Improvements in Collapsible Buckets and Receptacles for the Same, of which the following is a specification.

In carrying out the present invention, it is my purpose to provide a collapsible bucket primarily adapted for use by motorists, wherein the same may be properly extended for carrying water for filling the automobile radiator and other purposes. The nature of this bucket is such that the same may be readily collapsed to be received within a specific form of container embodied in the present invention, whereby the bucket may be conveniently stowed beneath the rear seat of the automobile.

In the drawings forming part of this application, like numerals of reference indicate similar parts in the several views, and wherein:—

Figure 1— is an elevational view of my improved collapsible bucket, the same being shown in its extended position.

Figure 2— is a vertical transverse cross sectional view of the same.

Figure 3— is a cross sectional view of the bucket in its collapsed condition, and being shown as being disposed within the receptacle provided for the same.

Figure 4— is a fragmentary elevational view of a portion of the receptacle for the bucket, disclosing an improved form of locking means for the cover of this container, and Figure 5— is a reduced perspective view of a drip pan included within the bucket container.

As shown in the drawings, my improved form of bucket contemplates the provision of a plurality of telescopic sections 1, 2, 3 and 4, the walls of these sections being of a sloping character as shown, and the lower section 1 being provided with a bottom 5. As will be readily understood, when the bucket is extended as shown in Figures 1 and 2, the upper end of each section will be tightly wedged within the lower end of the adjacent section for preventing total disengagement of the sections from each other when the bucket contains water or other substance.

The upper end of the top section 4 is beaded as at 6, and carries diametrically disposed vertical brackets 7 for receiving the opposite ends of a bail 8, which bail functions as the carrying handle for the bucket.

In Figures 3 and 4, I have shown an improved form of container specifically adapted for the reception of this bucket when in its collapsed position, whereby the same may be readily stowed within a convenient place of a motor vehicle.

This container is of annular shape and embodies a side wall 9 and bottom wall 10. Hinged as at 11 to the upper end of the container is a cover plate 12, this plate being provided with an overhanging lip 13 formed thereon, which lip is at a diametrically opposite point from the hinged connection 11, and is adapted for springing engagement over an enlargement 14 upon the upper adjacent end of the side wall 9 of the container.

Formed upon the bottom wall 10 of this container is a vertically extending annular flange 15, and received within this flange is a drip pan 16 within which is received the said bucket when in its collapsed position. As a means for preventing rattling of the several sections forming the bucket, the sections 1, 2 and 3 are formed at their lower ends with spaced knobs 17, whereby when the bucket is collapsed as shown in Figure 3, the same will have close contact with the inner surface of adjacent sections.

I have shown and described my bucket as comprising four sections, but it is nevertheless to be understood that a greater number may be provided as found desirable and I further wish it to be understood that other minor changes may be made therein, without departing from the spirit and scope of the invention as claimed.

What I claim as new is:—

In a collapsible bucket, a plurality of sections telescopically associated with each other, whereby the said bucket may be collapsed or extended at will, a handle carried by the upper end of the bucket and knobs formed upon the lower ends of certain ones of the sections adapted for wedging engagement between adjacent sections when the bucket is collapsed.

In testimony whereof I affix my signature.

CARRIE FOUST.